No. 653,412. Patented July 10, 1900.
P. EBELING.
MACHINE FOR MANUFACTURING GLASSWARE.
(Application filed Jan. 26, 1900.)

(No Model.) 5 Sheets—Sheet 1.

WITNESSES:
Herbert Bradley.
F. E. Gaither.

INVENTOR,
Phillip Ebeling
by Dannie S. Wolcott
Att'y.

No. 653,412.

P. EBELING.
MACHINE FOR MANUFACTURING GLASSWARE.
(Application filed Jan. 26, 1900.)

(No Model.)

Patented July 10, 1900.

5 Sheets—Sheet 4.

WITNESSES:
Herbert Bradley.
F. E. Gaither

INVENTOR,
Phillip Ebeling
by Darwin L. Wolcott
Att'y.

No. 653,412. Patented July 10, 1900.
P. EBELING.
MACHINE FOR MANUFACTURING GLASSWARE.
(Application filed Jan. 26, 1900.)

(No Model.) 5 Sheets—Sheet 5.

WITNESSES: Herbert Bradley. F. E. Gaither

INVENTOR, Phillip Ebeling by Darwin S. Wolcott Att'y.

THE NORRIS PETERS CO., PHOTO-LITHO., WASHINGTON, D. C.

UNITED STATES PATENT OFFICE.

PHILLIP EBELING, OF FINDLAY, OHIO, ASSIGNOR TO THE DALZELL, GILMORE & LEIGHTON COMPANY, OF SAME PLACE.

MACHINE FOR MANUFACTURING GLASSWARE.

SPECIFICATION forming part of Letters Patent No. 653,412, dated July 10, 1900.

Application filed January 26, 1900. Serial No. 2,826. (No model.)

*To all whom it may concern:*

Be it known that I, PHILLIP EBELING, a citizen of the United States, residing at Findlay, in the county of Hancock and State of Ohio, have invented or discovered certain new and useful Improvements in Machines for the Manufacture of Glassware, of which improvements the following is a specification.

The invention described herein relates to certain improvements in machines for the manufacture of that class or kind of glassware having one part formed by pressing and another part by blowing; and the invention has for its object a construction of mechanism whereby the pressed portion of the article and a blank for the blown part may be simultaneously formed in a suitable sectional mold, one part or section of which is then removed and the blank portion then inclosed in a blow-mold and expanded therein.

It is a further object of the invention to provide for the transfer of the partially-formed article from the pressing to the blowing position and to provide for the simultaneous but independent pressing and blowing operations.

The invention is hereinafter more fully described and claimed.

Figure 1:
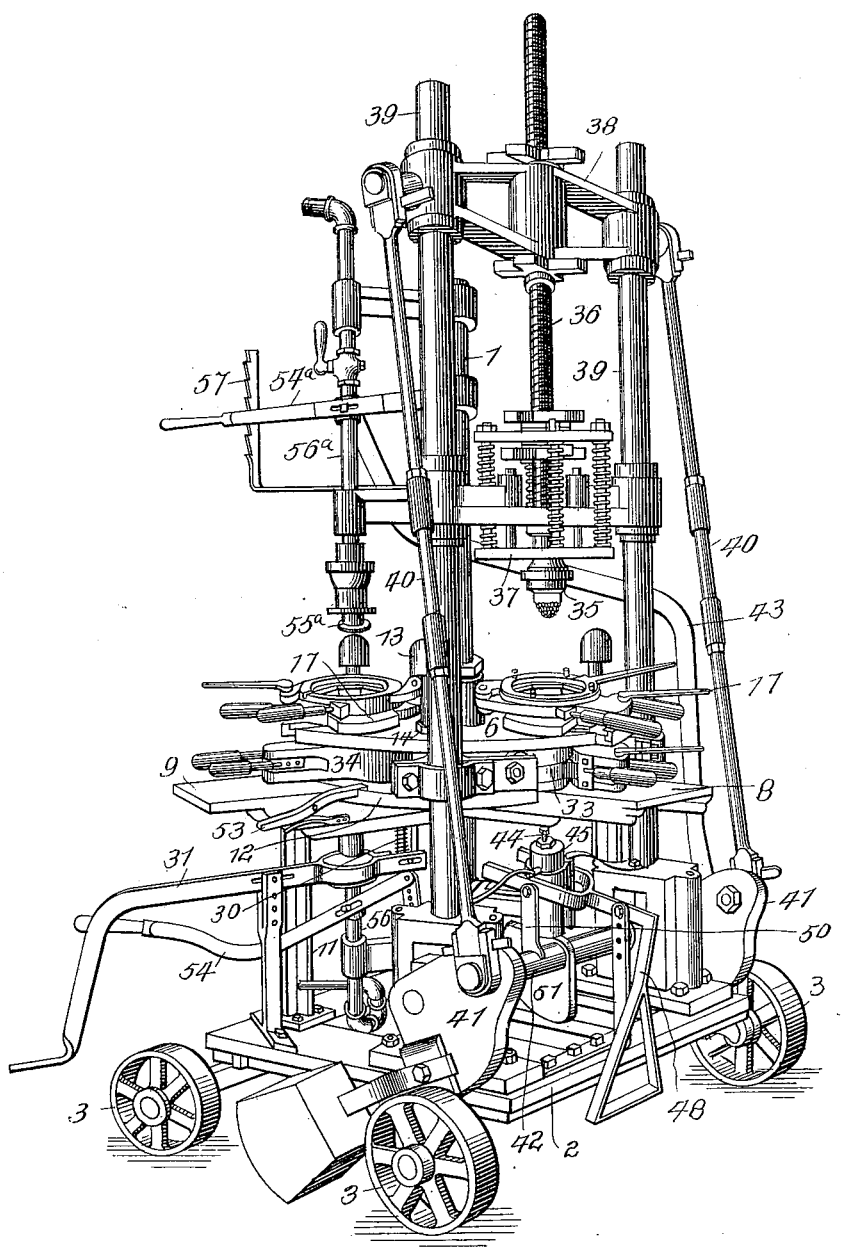
Figure 2:
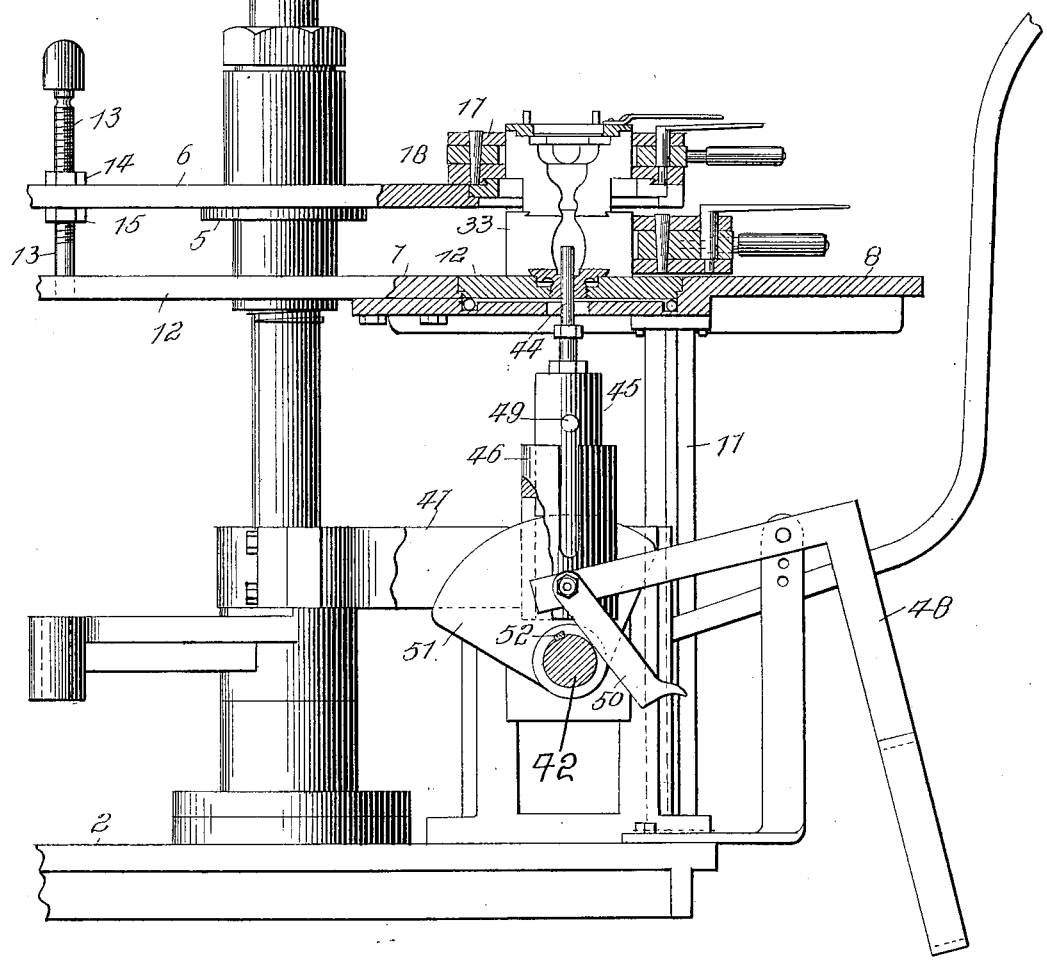
Figure 3:
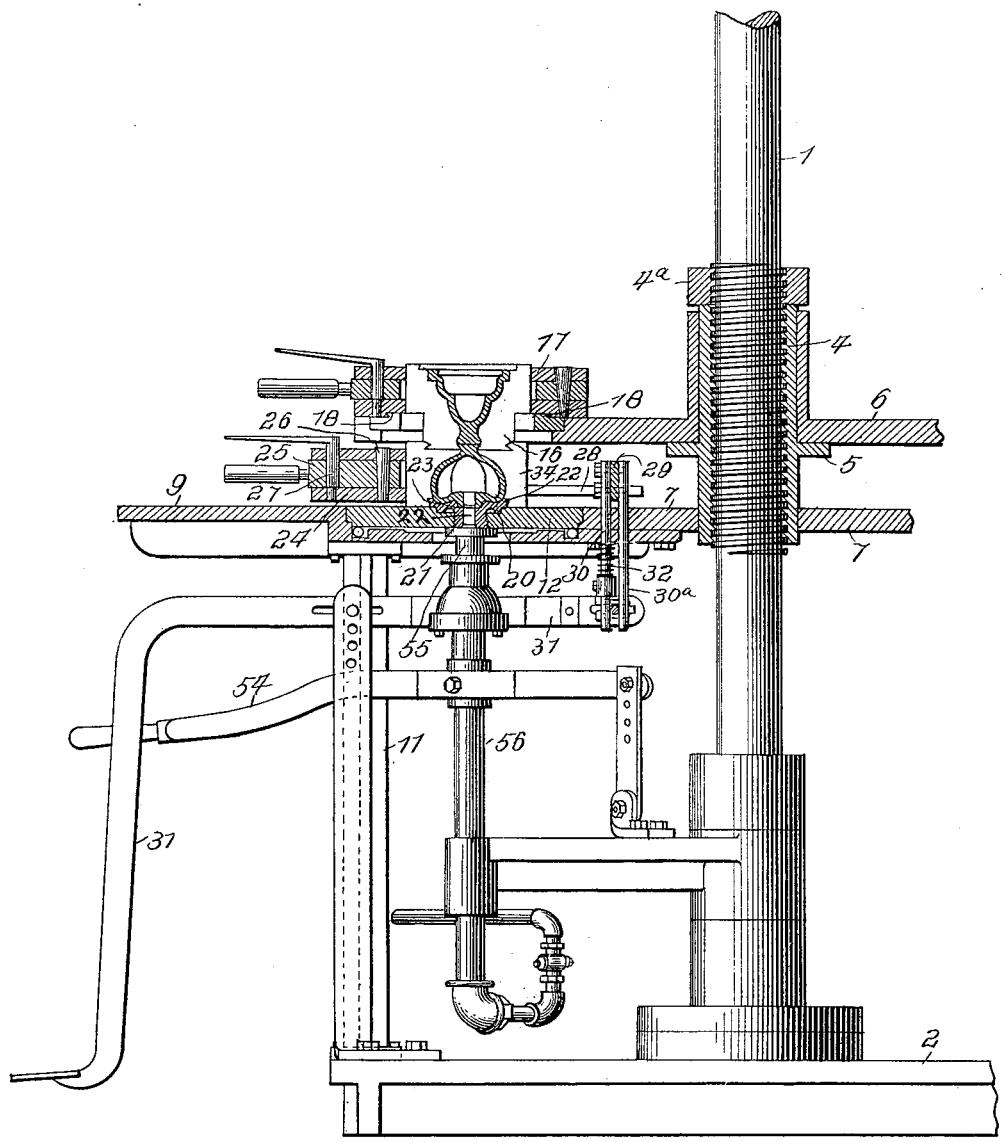
Figure 4:
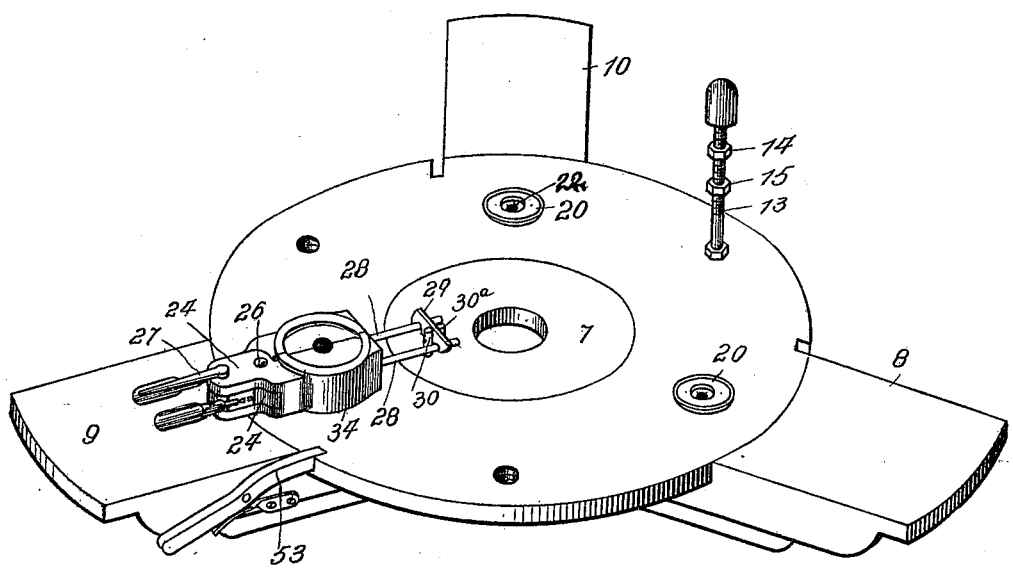
Figure 5:
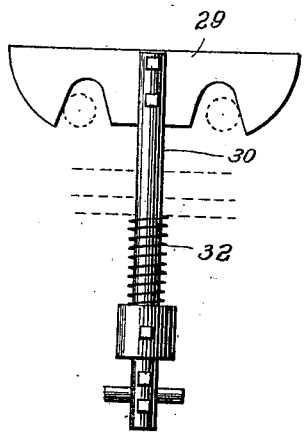
Figure 6:
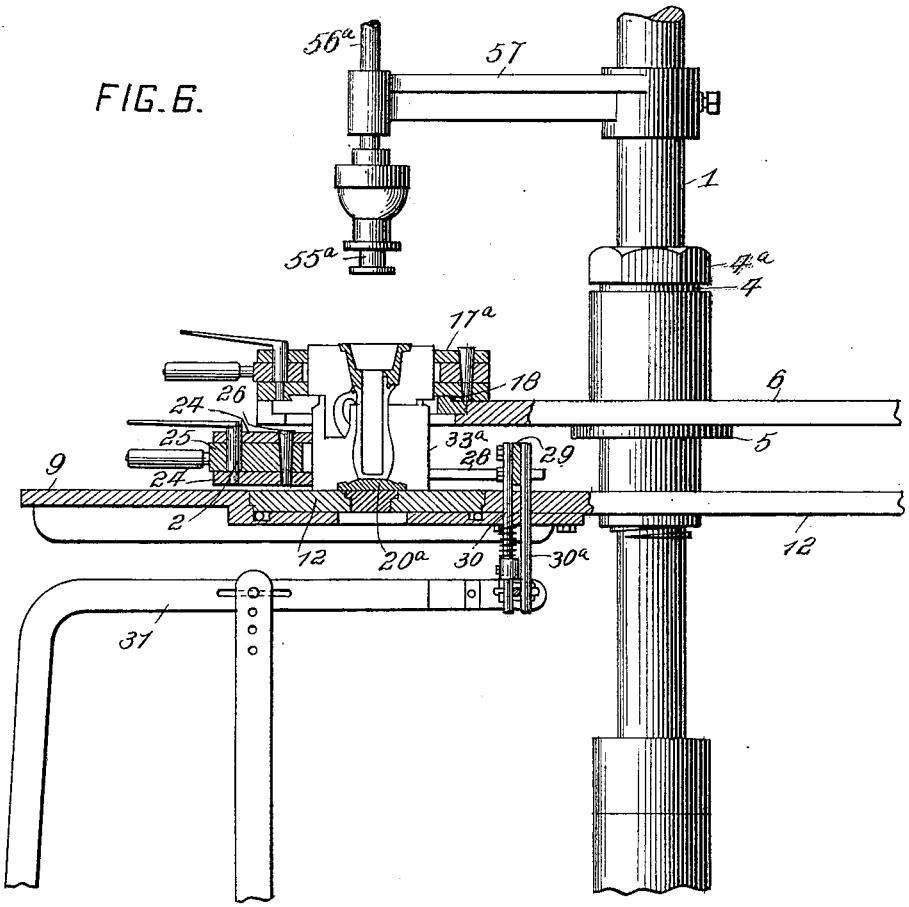
Figure 7:
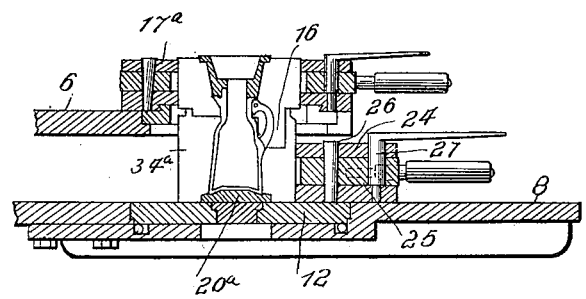

In the accompanying drawings, forming a part of this specification, Figure 1 is a perspective view of my improved machine. Fig. 2 is a sectional elevation through the pressing portion of the machine, the plunger and its operating mechanism being omitted. Fig. 3 is a similar view through the blowing portion of the machine. Fig. 4 is a perspective view of the lower table, showing a blow-mold in position thereon. Fig. 5 is a detail view showing the means for locking the blow-mold. Fig. 6 is a sectional view illustrating the manner of forming the pressing portions of an article having the blown portion formed by blowing through the pressed portion; and Fig. 7 is a view similar to Fig. 3, showing the construction of mechanism for top blowing.

In the practice of my invention a supporting post or pillar 1 is secured on a bed-plate 2, which is preferably provided with wheels 3 to facilitate the moving of the machine from place to place. A portion of the post or pillar is threaded for the internally-threaded sleeve 4, which is provided with a flange 5 for supporting the rotatable table 6. A platform 7, having radial projections or brackets 8 9 10, is supported by posts 11, secured to the bed-plate 2. This platform serves as a support for the annular table 12, which is preferably mounted on friction-rollers, as shown in Figs. 2 and 3. While any suitable means may be employed for insuring the rotation of the tables 6 and 12 in unison, the construction in Figs. 2 and 4 is a convenient means for that purpose. As shown, a series of threaded studs 13 are secured to the table 12 and extend up through the table 6. Nuts 14 and 15 are placed on these studs above and below the table 6 and serve to hold the tables in the desired vertical relation to each other. When it is desired to increase the distance between the tables, the upper nuts 14 and the jam-nut 4ª are screwed up and the table 6 is rotated to the right, thereby rotating the sleeve 4, the friction between the table and sleeve being sufficient for that purpose, when the sleeve is free to turn. When the table has been raised to the desired height, the jam-nut 4ª is screwed to bear on the sleeve, the nuts 15 screwed up to bear on the under side of the table, and the nuts 14 turned down to clamp the table. In lowering the table the nuts 15 are turned, the table rotated to the left, thereby screwing the sleeve down until the table bears on the nuts 15, whereupon the nuts 14 and 4ª are turned down to clamp the table in its new position.

The table 6 is provided with a series of openings through which a boss or projection 16 on the press-mold 17 projects. These openings are made sufficiently larger than the boss or projection 16 to permit of the mold, which is of the usual sectional form, to be opened wide enough for the removal of the completed article through the radial slots extending from the openings through the periphery of the table, as hereinafter described. In order to center the press-mold above the openings, the table 6 is provided with annular centering-ribs 18 around the openings, as shown in Figs. 2 and 3, and the under side of the mold 17 is recessed, so as to fit around said ribs when the mold is closed. The lower or annular table 12 is also provided with means for centering the blank and blow molds.

Such centering means being formed by disks 20, secured to the table in any suitable manner—as, for example, in the construction shown in Figs. 2 and 3—the disks are formed with threaded stems 21, screwing into threaded openings in the table. As these disks form the bottoms of the blank and blow molds, it is evident that their construction will vary in accordance with the article to be formed—as, for example, in making lamps the disks are formed with central passages 22, the purpose of which will be hereinafter stated, and with recesses 23 in their upper side around said passages for the formation of the neck of the lamp or other article.

It will be readily understood that as the blank and blow molds have to be drawn out from between the tables after the blank and blown parts are formed the usual construction of mold cannot be used. In order to provide for the drawing out of these molds, they are made in sections; but in lieu of pivoting the sections together on the side opposite the handles, as is customary, they are pivoted and locked on the front or handle side. To this end one section of the mold is formed with a slotted stem 24, through which is passed the stem 25, secured to or formed on the other section of the mold. These stems are arranged in such relation to the sections that when the sections are closed the stem 25 will lie within the stem 24, as clearly shown in Figs. 2, 3, and 4. These stems are hinged together by a pin 26 and are provided with holes outside of the pivot-pin for the reception of the locking-key 27, which is of the usual or any suitable form or construction.

While preferring to lock the mold-sections together by the key 27, the means shown in Figs. 3, 4, and 5 may be employed. As shown, the mold-sections are provided on their rear or opening edges with fingers 28, which when the molds are in pressing or blowing positions are drawn together by the inclined edges of the clamping-plates 29. These plates are attached to the upper ends of a rod 30, which projects up through the platform 7 and has its lower end connected to a lifting-treadle 31. The clamping-plate is drawn down to grip the fingers by spring 32, surrounding the rod 30. The clamping-plate is held in proper position by a second rod 30$^a$, but this function can be performed by any other suitable means.

As shown in Figs. 2 and 3, the blank-mold 33 and blow-mold 34 are formed with recesses in their upper and lower ends, so as to inclose the lower ends of the projections 16 on the press-molds and the disks 20 on the table 12, thereby holding all parts in true alinement during the pressing and blowing operations.

The pressing mechanism consists of a shaping-plunger 35, which is secured in the usual manner to the rod 36. The spring presser-plate 37 employed for holding the mold-ring in position is connected in the usual or any suitable manner to the rod 36. This rod is connected to the cross-head 38, movably mounted on the uprights 39, which are secured to the bed-plate 2. The cross-head is connected by pitmen 40 to arms 41 on the shaft 42, which is mounted in suitable bearings on the bed-plate. The shaft is rotated to shift the cross-head by a lever 43 or any other suitable means.

In order to form an initial opening in the bowl-blank, a pin 44 is passed up through the passage 22 in the disk 20 into the blank-mold. This pin is attached to a block 45, arranged in a guide 46, secured to an arm 47, attached to the central post or pillar 1 or supported in any other manner. The block and pin are raised sufficiently to at least close the opening in the disk 20 by means of an angular treadle 48, the inner end of which strikes against lugs 49 on the block 45. The block and pin are supported in this initial position by a dog 50, so pivotally connected to the inner end of the treadle that when the latter is shifted to raise the block and pin the lower end of the dog will swing in and rest on the shaft 42.

After the pin 44 has been raised to initial position by the treadle glass is dropped into the press-mold and the lever 43 is shifted to force down the shaping-plunger 35. By the rotation of the shaft 42 a cam 51 is moved under the block 45, thereby completely raising the pin 44 into the blank-mold or supporting the pin in the position to which it had been previously raised by the treadle 48. After the cam has passed under the block the dog 50 is pushed off the shaft by a projection 52 thereon, so that when the cam moves back from under the block the latter will fall, withdrawing the pin from the mold and disk 20.

By the pressing operation such parts of the article as the foot and neck are completely formed and the bowl portion is given its initial shape. As soon as the shaping-plunger and pin are withdrawn the blank-mold is unlocked, opened, and drawn out onto the bracket 8, leaving the article suspended from the press-mold, but with its lower end or neck in engagement with the recess 23 in the disk 20. The tables are now unlocked by shifting the locking-lever 53 out of engagement with the notch in the table 12 and then rotated to bring the article to blowing position and to bring another press-mold to pressing position. The blow-mold is then pushed in and closed around the bowl-blank, at the same time inclosing in the recesses at its ends the disk 20 and the projection 16 on the press-mold, thereby insuring the proper centering of the blow-mold. As soon as the blow-mold is closed and locked the lever 54 is lifted, thereby pressing the nozzle 55 of the movable blast-pipe 56 against the under side of the table 12 with its opening in line with the passage 22 through the disk 20. The nozzle is movable in the blast-pipe, so that when pressed against the table a port will be opened automatically to permit the passage of air into the recess formed in the blank. Any form or construction of nozzle known in the art for this purpose may be employed. By the action of this air-blast the bowl-blank is expanded to conform with the blow-mold. After the bowl has been blown the blow-mold is unlocked, opened, and drawn out onto the bracket 9. By the time the bowl has been blown the pressing of another article has been completed and the blank-mold withdrawn, so that the tables can be unlocked and shifted. By this movement of the tables the completed article is brought to the bracket 10, where the press-mold is opened and the article removed through the slot in the edge of the table 6. While the bracket 10 forms a convenient support on which the completed article can be placed, it may be omitted.

It is characteristic of my improvements that the parts of the article which are completed by the pressing operation are not moved with reference to their forming-surfaces during the movement of the tables or the carrying of the article from pressing to blowing position. It is also characteristic of my improvement that the blank from which the blown portion is to be formed is supported at its upper and lower ends while being shifted, thereby avoiding all liability of distortion.

As shown in Figs. 6 and 7, my improvements can be employed for manufacturing articles where it is necessary to force the air for expanding the body through the neck or portions formed by pressing, as in the manufacture of molasses-jugs. In making such articles the disks 20 are replaced by the solid or imperforate disks $20^a$, the upper surface of which is constructed to impart the desired contour to the bottom of the article. The press-molds $17^a$ are similar to the molds 17, except as regards the contours of the glass-shaping surfaces, which are constructed in accordance with rules well known in the art to produce the desired shapes. The blank-molds $33^a$ and blow-molds $34^a$ are altered only as regards their shaping-surfaces.

To effect the top blow of the blank, a movable blast-pipe $56^a$ is supported above the tables by arms 57, extending from the central post or pillar 1, as shown in Fig. 1. This blast-pipe, which is provided with a nozzle $55^a$, having an automatically-operating valve, is moved to cause the nozzle to bear on top of the press-mold by means of a hand-lever $54^a$. The lever and nozzle are supported in a raised position by a toothed bar 57, with which the lever engages, or by any other suitable means.

While the blank and blow molds have been described with some particularity, no claim is made herein for such construction of mold, as it forms the subject of another application, Serial No. 3,157, filed on or about January 29, 1900.

One of the essential characteristics of my improvement is the provision of suitable supports for the blank and blow molds under the positions occupied by the press-molds, such supports being movable with the press-molds and maintained in alinement therewith, and hence as regards the broad terms of the claims the invention is not limited to the construction shown and described.

While I have described the pressed portion of the article and the blank as being formed in two molds, the latter are practically two sections of one mold, and the part described as the "blow-mold" is a section of said mold interchangeable with the blank-forming section.

It is characteristic of my improvements that the molds consist of three horizontal sections. One section is carried by the upper support and provided with a matrix suitable for shaping the pressed portion of the article. A second section is carried by the lower support and is constructed to shape a portion of the blank and a portion of the blown part of the article. The third section of the mold consists of two interchangeable parts, one adapted to form the blank and the other to form the blown part of the article.

I claim herein as my invention—

1. In a machine for the manufacture of glassware the combination of a glass-pressing and a glass-blowing mechanism, two movable supports for mold-sections arranged in different horizontal planes, each of said supports being provided with means for centering the mold-sections, means for adjusting said supports toward and from each other and means for securing the equal and synchronous movements of both supports, substantially as set forth.

2. In a machine for the manufacture of glassware the combination of two movable supports for mold-sections arranged in different horizontal planes, each support being provided with means for centering the mold-sections, such centering means being in alinement with each other, and means for securing the equal and synchronous movements of both supports, substantially as set forth.

3. In a machine for the manufacture of glassware, the combination of a movable support having a series of openings, a series of mold-sections arranged on the support, portions of the mold-sections projecting through the said openings, a support arranged below the openings of the other support and movable therewith, mold-sections arranged on the lower support in line with the sections in the upper support, and interchangeable mold-sections constructed to inclose the projecting ends of the upper and lower mold-sections, substantially as set forth.

4. In a machine for the manufacture of glassware, the combination of a movable support having a series of openings, a series of mold-sections arranged on said support, portions of the mold-sections projecting through said openings, a continuous support arranged below the other support and movable therewith, projections, disks adapted to form the bottoms of molds arranged on the second support in line with the openings in the upper support and interchangeable mold-sections formed at their ends for the reception of the projecting ends of the upper mold-sections and the disks, substantially as set forth.

5. In a machine for the manufacture of glassware, the combination of a mold-support having an opening therein, a section of a press-mold arranged on the support a portion of said section projecting through the opening, a second support, a disk or lower mold-section having an opening therethrough arranged in a seat in the second support, and forming a mold-bottom, a mold-section inclosing said disk and the projecting portion of the upper mold-section, a pin and means for raising said pin through the disk into the lower mold-section, substantially as set forth.

6. In a machine for the manufacture of glassware, the combination of a mold-support, a mold formed of sections provided with pivotally-connected handles and with lugs and projections on the sides opposite the handles, and means mounted on the machine for engaging the lugs or projections on the mold-sections and holding them in closed position, substantially as set forth.

In testimony whereof I have hereunto set my hand.

PHILLIP EBELING.

Witnesses:
  WM. F. DUNCAN,
  WM. A. DEMLAND.